United States Patent
Glasco, Jr. et al.

(10) Patent No.: US 11,546,218 B1
(45) Date of Patent: Jan. 3, 2023

(54) SYSTEMS AND METHODS FOR BI-DIRECTIONAL MACHINE-LEARNING (ML)-BASED NETWORK COMPATIBILITY ENGINE

(71) Applicant: Bank of America Corporation, Charlotte, NC (US)

(72) Inventors: Jeffrey Glasco, Jr., Fort Mill, SC (US); Benjamin Daniel Hardman, Harrisburg, NC (US); Robert Brice, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/460,461

(22) Filed: Aug. 30, 2021

(51) Int. Cl.
*H04L 41/0873* (2022.01)
*H04L 9/40* (2022.01)
*G06N 20/00* (2019.01)

(52) U.S. Cl.
CPC ......... *H04L 41/0873* (2013.01); *G06N 20/00* (2019.01); *H04L 63/0263* (2013.01)

(58) Field of Classification Search
CPC . H04L 41/0873; H04L 63/0263; H04L 41/16; G06N 20/00; H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 7,225,133 B1 | 5/2007 | McIntosh | |
| 8,423,963 B2 | 4/2013 | Garbers et al. | |
| 8,683,554 B2 | 3/2014 | Martin et al. | |
| 9,697,362 B2 | 7/2017 | Kaplan et al. | |
| 9,824,222 B1 | 11/2017 | Kaplan et al. | |
| 10,341,321 B2 | 7/2019 | Kumar et al. | |
| 10,614,223 B2 | 4/2020 | Abramovsky et al. | |
| 10,911,495 B2* | 2/2021 | Dixit | H04L 41/5019 |
| 11,018,939 B1* | 5/2021 | Harris | G06K 7/1413 |
| 11,025,675 B2 | 6/2021 | Barday et al. | |
| 11,310,259 B2* | 4/2022 | Jenkins | G06N 20/00 |
| 2004/0192306 A1* | 9/2004 | Elkarat | H04W 8/06 455/435.2 |
| 2015/0222549 A1* | 8/2015 | Kakadia | H04L 47/283 370/231 |
| 2020/0106793 A1 | 4/2020 | Vanamali | |
| 2020/0242254 A1 | 7/2020 | Velur et al. | |
| 2020/0250316 A1 | 8/2020 | Rickerd et al. | |

(Continued)

*Primary Examiner* — Michael Won
(74) *Attorney, Agent, or Firm* — Weiss & Arons LLP

(57) ABSTRACT

An ML-based method for conforming a target network to control requirements of a host network is provided. The method may include running a first digital scan of the host network and determining the host network's control requirements based on the first digital scan. The method may include identifying, based on the second digital scan, elements of the target network that violate the control requirements. The method may include generating a compliance report and/or an executable file. The compliance report may include a compatibility score of the target network vis-à-vis the host network, and a compatibility plan that includes steps which improve the compatibility score and conform the target network to the control requirements of the host network. The executable file, when executed at the target network, may execute the compatibility plan.

20 Claims, 5 Drawing Sheets

(56) References Cited

U.S. PATENT DOCUMENTS

2020/0320418 A1 10/2020 Aminian et al.
2021/0081632 A1 3/2021 Batch et al.
2021/0117236 A1* 4/2021 Patel ..................... G06Q 40/06

* cited by examiner

SYSTEMS AND METHODS FOR BI-DIRECTIONAL MACHINE-LEARNING (ML)-BASED NETWORK COMPATIBILITY ENGINE

FIELD OF TECHNOLOGY

Aspects of the disclosure relate to digital systems. Specifically, aspects of the disclosure relate to machine-learning-based systems within multi-network environments.

BACKGROUND OF THE DISCLOSURE

Entities running digital networks often utilize third party networks in conjunction with their own networks. For example, the entity may contract with a third party vendor to perform a service. Performance of the service may involve the third party's network running on, or in connection with, the entity's network.

The entity may have security or other control requirements and standards for its digital environment. When a third party's network is running on, or in connection with, the entity's network, the entity's environment may be jeopardized if the third party network does not comply with the control requirements of the entity network.

Accordingly, it would be desirable to provide systems and methods for determining the compliance of a target third party network with the control requirements of a host network. It would be further desirable to update the target network to conform to the control requirements.

Moreover, the control requirements and standards for the entity's digital environment are sometimes not known or readily available. It would be further desirable, therefore, for the systems and methods to autonomously determine the control requirements of the entity's digital environment prior to determining the compliance of the target network.

SUMMARY OF THE DISCLOSURE

Aspects of the disclosure relate to a bi-directional machine-learning (ML)-based network compatibility engine. The engine may include a processor, an ML module, a non-transitory memory, and computer executable instructions stored in the memory. The instructions, when run on the processor, may perform some or all the features of the engine.

The engine may be configured to scan a host network and determine, using the ML module, the host network's control requirements based on the scan. The engine may also be configured to scan a target network and identify elements of the target network that violate the control requirements.

The engine may be configured to generate, using the ML engine, a compliance report and an executable file. The compliance report may include a compatibility score of the target network vis-à-vis the host network. The compliance report may also include a compatibility plan that includes steps which improve the compatibility score and conform the target network to the control requirements of the host network. The executable file, when executed at the target network, may be configured to execute the compatibility plan.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
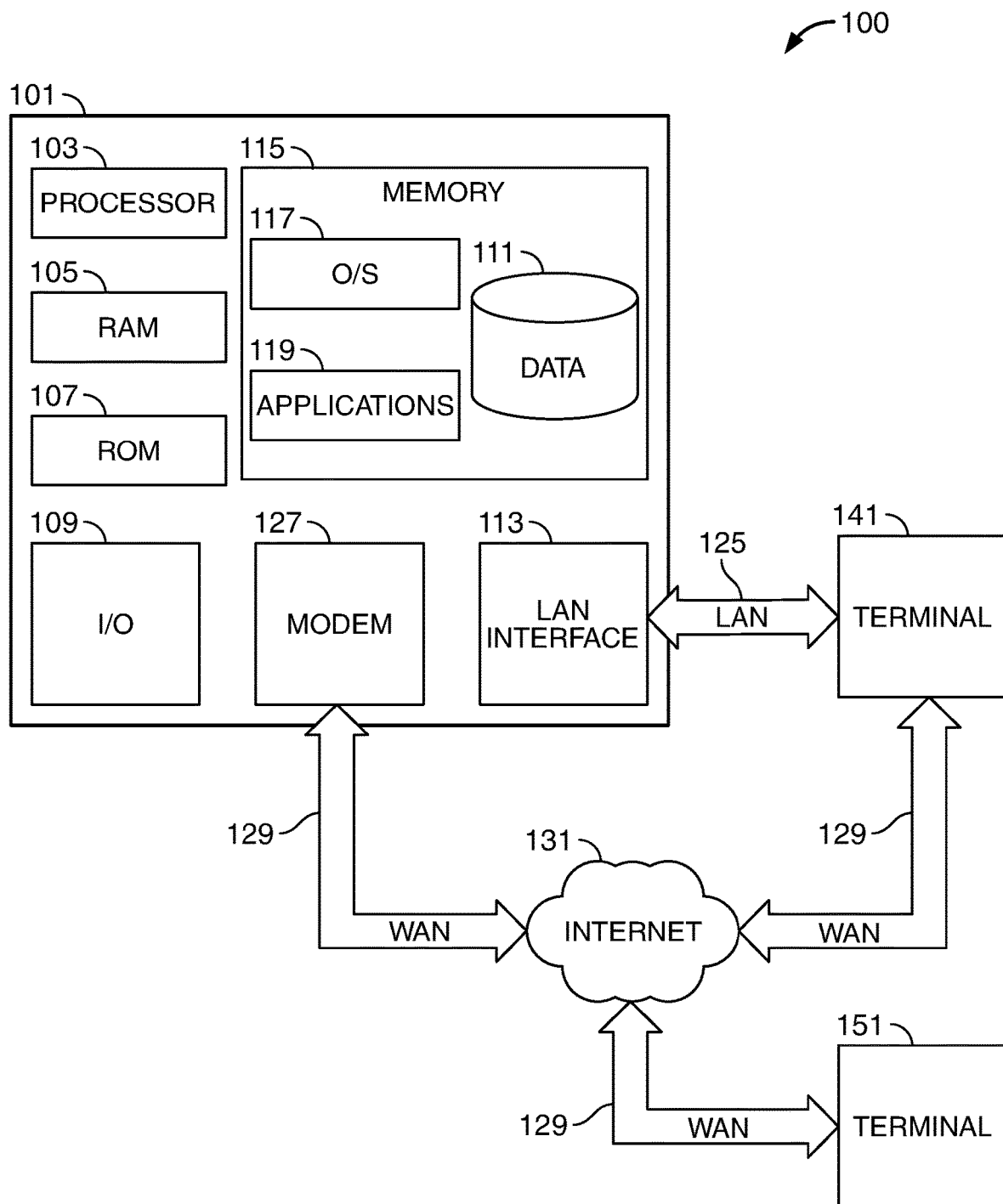
FIG. 1 shows an illustrative system in accordance with principles of the disclosure.

Aspects of the disclosure relate to a bi-directional machine-learning (ML)-based network compatibility engine. In certain embodiments, the engine may be part of, or may otherwise be referred to as, a system. The engine may include a processor, an ML module, a non-transitory memory, and computer executable instructions stored in the memory. The instructions, when run on the processor, may perform some or all the features of the engine.

The engine may be configured to scan a host network. The host network may, for example, be a network associated with an entity. The entity may wish to utilize another network, otherwise referred to herein as a target network, in conjunction with the host network. Utilization of the target network in conjunction with the host network may include running the target network on the host network. Utilization of the target network in conjunction with the host network may also include running the target network adjacent to, or in communication with, the host network.

The target network may be associated with a third party. In some embodiments, the target network may be associated with the same entity as the host network. The target network may be providing a service. The service may include software as a service (SAAS). In some embodiments, the target network may be a network that is being incorporated with the host network, physically or virtually, to create a combined network.

The host network may be associated with control requirements. The control requirements may include certain settings, configurations, and/or specifications that are recommended or required for safe, secure, and/or efficient operation of the host network. For example, the host network may require a certain level of security within the target network. The level of security may include network firewall settings and configurations. The level of security may include data loss prevention (DLP) settings and configurations. The level of security may include the presence of, or a threshold degree of, anti-virus protection. Degree of anti-virus protection may include a minimum version number or year. In another example, the host network may require a certain amount of memory or processing power, or suitable software capabilities, to be available on the target network.

The engine may be configured to determine the host network's control requirements based on the scan. The determination may be performed using the ML module. For example, certain hardware or software components, or combinations of components, may be associated with certain control requirements. The associations may be based on manufacturer or developer recommendations. These recommendations may be available online, and the ML module may be trained to mine the internet for such information.

In another example, the associations may be based on historical data regarding operations of the host network and/or other comparable networks. The operations may include interactions between the host network and the present, or alternatively, other, target networks. The ML module may be trained with the historical data and may learn which components and component combinations require certain control configurations to operate properly. The associations may also be legal based. For example, certain components, such as databases storing sensitive information, may be associated with legally mandated privacy controls.

The engine may be configured to scan the target network and identify elements of the target network that violate the control requirements determined for the host network. For example, if the scan of the host network determined that a control requirement included version 10 of an operating system (OS), the scan of the target network may identify that the target network has version 9 of the OS, and therefore violates the control requirements.

The engine may be configured to generate, using the ML engine, a compliance report and an executable file. The compliance report may include a compatibility score of the target network vis-à-vis the host network. The compatibility score may be a letter or number score that reflects a degree of compliance of the target network with the control requirements of the host network.

The compatibility score may, in certain embodiments, be a binary (e.g., pass/fail) indication of compliance versus non-compliance of the target network with the control requirements of the host network. For example, in the aforementioned scenario where the control requirements of the host network were determined to include version 10 of the OS, and the scan of the target network identified version 9 the OS, the compatibility score of the target network may indicate a fail.

The compliance report may also include a compatibility plan that includes steps which improve the compatibility score and/or conform the target network to the control requirements of the host network. For example, in the aforementioned scenario where the control requirements of the host network were determined to include version 10 of the OS, and the scan of the target network identified version 9 the OS, and the compatibility score of the target network indicated a fail, the compatibility plan may include executing an update of the OS to version 10.

The executable file, when executed at the target network, may be configured to execute the compatibility plan. For example, the executable file may include instructions to execute the update (in the aforementioned scenario) or execute any other suitable installation or operation included in the compatibility plan. In some embodiments, the engine may be further configured to automatically execute the executable file at the target network.

In certain embodiments, the engine may be further configured to periodically rescan the host network to determine if the control requirements are changed. For example, hardware or software components of the network may have been modified, or other changes may have occurred, which may effect a change in control requirements.

When the control requirements are changed, the engine may be configured to rescan the target network to determine if the compatibility score or the compatibility plan are changed due to the changed control requirements. When the compatibility score or the compatibility plan are changed, the engine may be configured to update the compliance report and/or the executable file.

In some embodiments, the engine may be configured to periodically rescan the target network. Rescanning the target network may be executed independently of any change to the control requirements of the host. Rescanning the target network may determine if the compatibility score or the compatibility plan are changed. When the compatibility score or the compatibility plan are changed, the engine may update the compliance report.

In some embodiments, the target network may be a first target network. The scan of the first target network may identify that the first target network is host to a second target network (i.e., a nested target network). In this scenario, the engine may be further configured to determine, using the ML module, the first target network's control requirements. The engine may scan the second target network, identify elements of the second target network that violate the control requirements of the first target network or of the host network, and incorporate information pertaining to the second target network into the compliance report.

The system may thereby effectively perform a recursion of the process performed on the host network and the first target to the first target network—in its function as a host—and the second target network. The recursion may be further performed for additional successive nested target networks identified in any downstream target networks.

In certain embodiments the engine may be configured to perform a preliminary scan of the target network to determine a category of the target network. The preliminary scan may be performed prior to the scan of the host network. Moreover, the scan of the host network may be tailored based on the category of the target network. For example, different control requirements of the host network may be associated with different categories of target networks. The scan of the host network to determine the control requirements may be more efficient when tailored based on the category of the target network.

In some embodiments, the scan of the target network may be tailored based on the results of the scan of the host network. For example, the scan of the target network may be tailored to focus on components that relate to the control requirements that have been determined for the host network, resulting in more efficient resource utilization.

An ML-based method for conforming a target network to control requirements of a host network is provided. The method may include running a first digital scan of the host network, and determining, using an ML module, the host network's control requirements based on the first digital scan. The method may also include running a second digital scan of the target network, and identifying, based on the second digital scan, elements of the target network that violate the control requirements.

The method may also include generating, using the ML engine, a compliance report and/or an executable file. The compliance report may include a compatibility score of the target network vis-à-vis the host network, and a compatibility plan that includes steps which improve the compatibility score and conform the target network to the control requirements of the host network. The executable file, when executed at the target network, may execute the compatibility plan.

The method may, in some embodiments, include steps and features recited elsewhere in the disclosure in conjunction with other methods, or with apparatus including disclosed systems and engines.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to network control settings, configurations, and/or requirements. The input/output module may also include one or more speakers for providing audio output and a video display device for providing textual, audio, audiovisual, and/or graphical output. The input and output may be related to computer application functionality. The input and output may be related to network control settings, configurations, and/or requirements.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to network control settings, configurations, and/or requirements.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
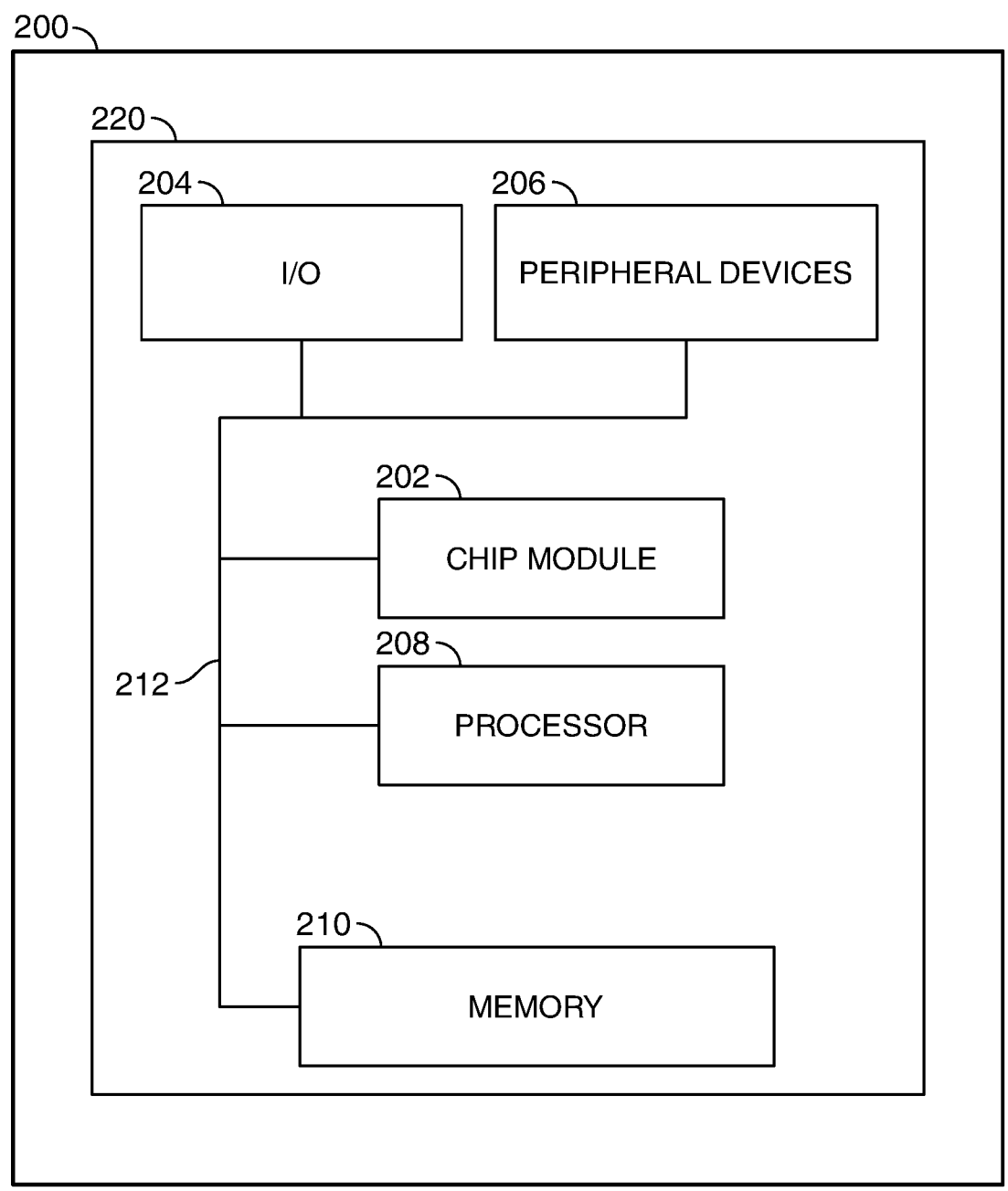
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
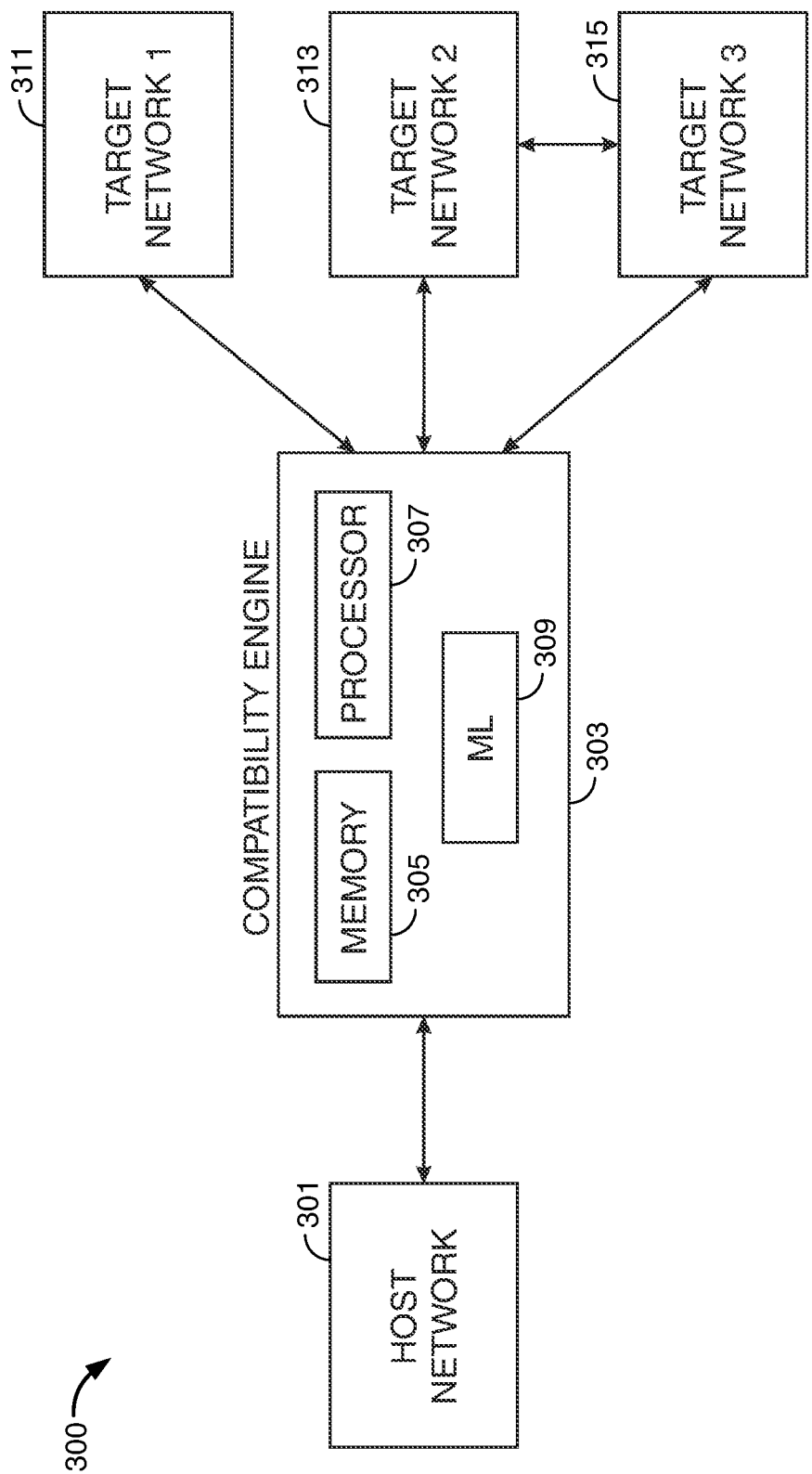
FIG. 3 shows an illustrative system architecture in accordance with principles of the disclosure.

FIG. 3 shows illustrative system architecture 300 in accordance with principles of the disclosure. Architecture 300 shows host network 301. Architecture 300 also shows compatibility engine 303. Compatibility engine 303 includes memory 305, processor 307, and ML engine 309. Architecture 300 shows target network 1 (311), target network 2 (313), and target network 3 (315).

Target network 1 (311) and target network 2 (313) may be third party networks that are being introduced to the environment of host network 301, and which will be scanned, analyzed, and/or updated by compatibility engine 303. Target network 3 (315) may be a nested target network that is hosted by target network 2 (315). In that case, compatibility engine 303 may scan target network 2 (315) to determine its control requirements, and then scan, analyze, and/or update target network 3 (315) based on the control requirements of target network 1 (311) and/or target network 2 (313).

Figure 4:
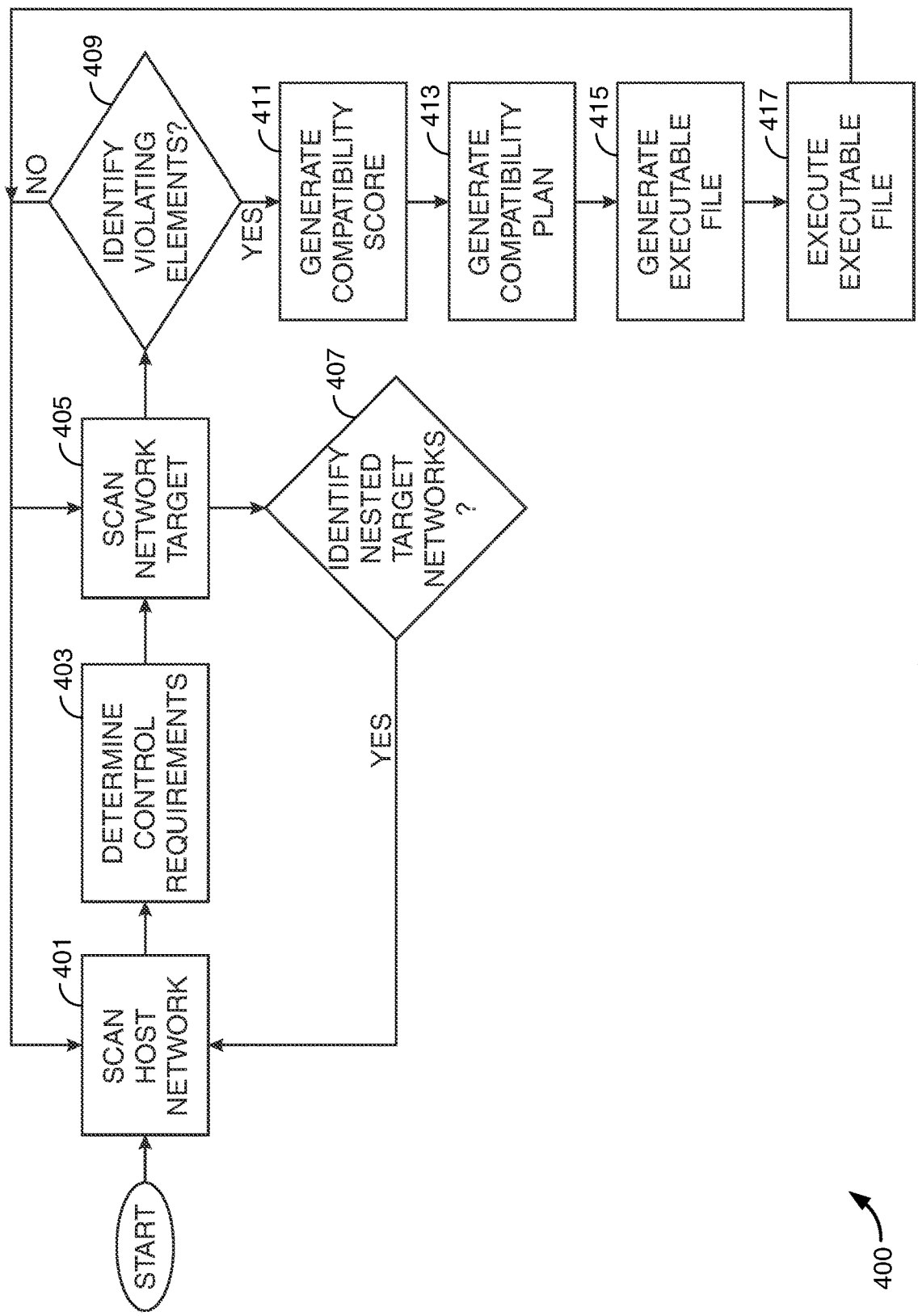
FIG. 4 shows an illustrative flowchart in accordance with principles of the disclosure.

FIG. 4 shows illustrative flowchart 400 in accordance with principles of the disclosure. Flowchart 400 starts with scanning a host network at step 401. At step 403, the system may determine control requirements of the host network based on the scan. At step 405, the system may scan a target network. The scan of the target network may, in certain embodiments, be tailored based on the control requirements determined for the host network. If a nested target network is identified at step 407, the system may perform a recursive process on the target (as a host) and its downstream (i.e., nested) target.

If a violating element of the target network is identified at step 409, the system may generate a compatibility score at step 411. The system may also generate a compatibility plan at step 413. At step 415, the system may generate an executable file. The executable file may be executed at the target network step 417. The executable file may perform the compatibility plan, and may thereby update the target network to be in compliance with the control requirements of the host network.

Periodically the system may rescan the host network and/or the target network to determine if there is a change in the control requirements and/or the compatibility score or plan. The system may, for example, perform a rescan at predetermined intervals of time (e.g., every month, week, day, hour, minute, second, substantially continuously, or at any other suitable period). The system may rescan the target network after a rescan of the host network identifies a change. The system may also perform a rescan after finding no violating elements at step 409 and/or after executing the executable file at step 417.

Figure 5:
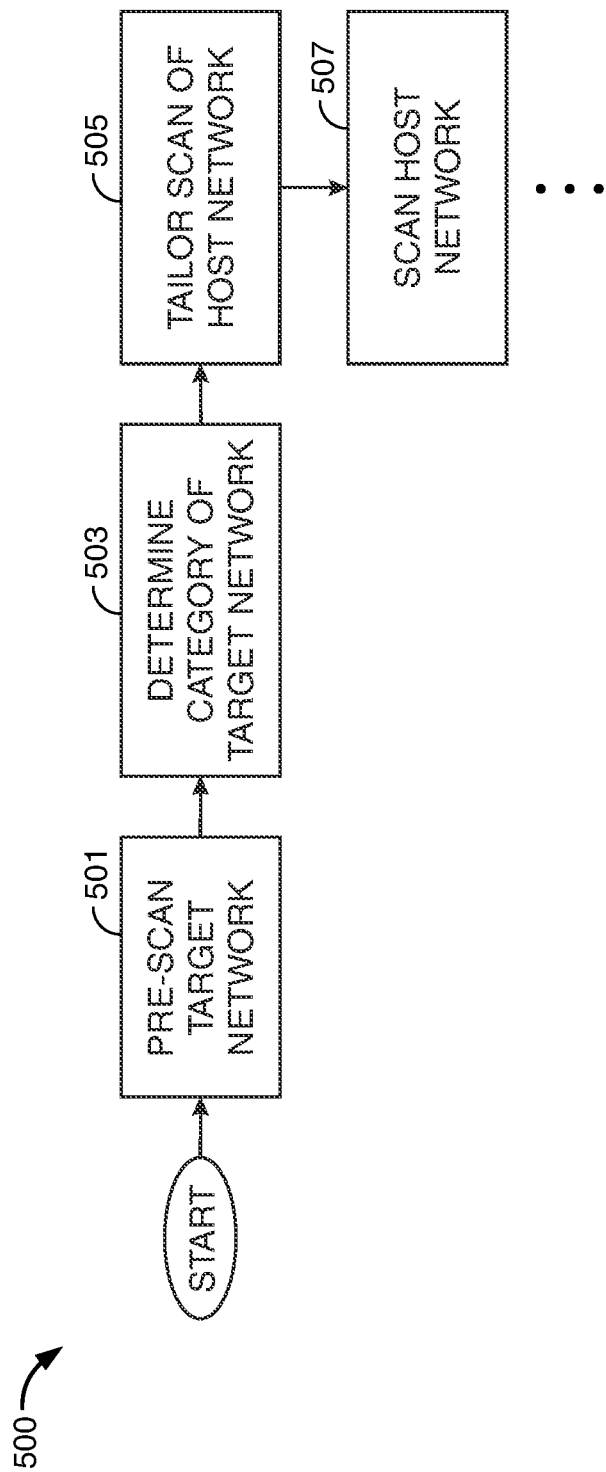
FIG. 5 shows another illustrative flowchart in accordance with principles of the disclosure.

FIG. 5 shows illustrative flowchart 500 in accordance with principles of the disclosure. Flowchart 500 shows an illustrative preliminary scan. The preliminary scan may, in certain embodiments, be performed prior to scanning the host network, i.e., prior to step 401 shown in FIG. 4. The preliminary scan may start at step 501 with a pre-scan of the target network. At step 503, the system may determine a category of the target network based on the pre-scan. At step 505 the system may generate a tailored scan of the host network based on the determined category of the target network. At step 507, the system may scan the host network using the tailored scan of step 505. Step 507 may coincide with step 401 of FIG. 4, and the system may proceed to step 403.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for bi-directional machine-learning (ML)-based network compatibility engines are provided. Persons skilled in the art will appreciate that the present invention can be practiced by other than the described embodiments, which are presented for purposes of illustration rather than of limitation, and that the present invention is limited only by the claims that follow.

What is claimed is:

1. A bi-directional machine-learning (ML)-based network compatibility engine, said engine comprising:
   a processor;
   an ML module;

a non-transitory memory; and computer executable instructions stored in the memory, that, when run on the processor, are configured to:
- scan a host network;
- determine, using the ML module, the host network's control requirements based on the scan;
- scan a target network;
- identify elements of the target network that violate the control requirements; and
- generate, using the ML engine:
  - a compliance report that comprises:
    - a compatibility score of the target network vis-à-vis the host network; and
    - a compatibility plan that includes steps which improve the compatibility score and conform the target network to the control requirements of the host network; and
  - an executable file that, when executed at the target network, executes the compatibility plan.

2. The engine of claim 1 further configured to automatically execute the executable file at the target network.

3. The engine of claim 1 further configured to:
- periodically rescan the host network to determine if the control requirements are changed;
- when the control requirements are changed, rescan the target network to determine if the compatibility score or the compatibility plan are changed due to the changed control requirements; and
- when the compatibility score or the compatibility plan are changed, update the compliance report.

4. The engine of claim 1 further configured to:
- periodically rescan the target network to determine if the compatibility score or the compatibility plan are changed; and
- when the compatibility score or the compatibility plan are changed, update the compliance report.

5. The engine of claim 1 wherein:
- the target network is a first target network; and
- when the scan of the first target network identifies that the first target network is host to a second target network, the engine is further configured to:
  - determine, using the ML module, the first target network's control requirements;
  - scan the second target network;
  - identify elements of the second target network that violate the control requirements of the first target network or of the host network; and
  - incorporate information pertaining to the second target network into the compliance report.

6. The engine of claim 1 wherein:
- prior to the scan of the host network, the engine is configured to perform a preliminary scan of the target network to determine a category of the target network; and
- the scan of the host network is tailored based on the category of the target network.

7. The engine of claim 1 wherein the scan of the target network is tailored based on the results of the scan of the host network.

8. The engine of claim 1 wherein the control requirements comprise:
- data loss prevention (DLP) settings and configurations; and
- network firewall settings and configurations.

9. The engine of claim 1 wherein the ML module is trained using historical data regarding interactions between the host network and other target networks.

10. A machine-learning (ML)-based method for conforming a target network to control requirements of a host network, the method comprising:
- running a first digital scan of the host network;
- determining, using an ML module, the host network's control requirements based on the first digital scan;
- running a second digital scan of the target network;
- identifying, based on the second digital scan, elements of the target network that violate the control requirements; and
- generating, using the ML engine:
  - a compliance report that comprises:
    - a compatibility score of the target network vis-à-vis the host network; and
    - a compatibility plan that includes steps which improve the compatibility score and conform the target network to the control requirements of the host network; and
  - an executable file that, when executed at the target network, executes the compatibility plan.

11. The method of claim 10 further comprising automatically executing the executable file at the target network.

12. The method of claim 10 further comprising:
- periodically rescanning the host network to determine if the control requirements are changed;
- when the control requirements are changed, rescanning the target network to determine if the compatibility score or the compatibility plan are changed due to the changed control requirements; and
- when the compatibility score or the compatibility plan are changed, updating the compliance report.

13. The method of claim 10 further comprising:
- periodically rescanning the target network to determine if the compatibility score or the compatibility plan are changed; and
- when the compatibility score or the compatibility plan are changed, updating the compliance report.

14. The method of claim 10 wherein the target network is a first target network, and, when the scan of the first target network identifies that the first target network is host to a second target network, the method further comprises:
- determining, using the ML module, the first target network's control requirements;
- digitally scanning the second target network;
- identifying elements of the second target network that violate the control requirements of the first target network or of the host network; and
- incorporating information pertaining to the second target network into the compliance report.

15. The method of claim 10 further comprising:
- performing, prior to the first digital scan, a preliminary scan of the target network to determine a category of the target network; and
- tailoring the first digital scan based on the category of the target network.

16. The method of claim 10 further comprising tailoring the second digital scan based on the results of the first digital scan.

17. The method of claim 10 wherein the control requirements comprise:
- data loss prevention (DLP) settings and configurations; and
- network firewall settings and configurations.

18. The method of claim 10 further comprising training the ML module using historical data regarding interactions between the host network and other target networks.

19. A machine-learning (ML)-based network compatibility system, the system comprising:
- a host network;
- an ML module; and
- computer code stored in a non-transitory memory for running on a processor; wherein the system is configured to:
- scan the host network;
  - determine, using the ML module, the host network's control requirements based on the scan;
  - scan a target network;
  - identify elements of the target network that violate the control requirements; and
  - generate, using the ML engine:
    - a compliance report that comprises:
      - a compatibility score of the target network vis-à-vis the host network; and
      - a compatibility plan that includes steps which improve the compatibility score and conform the target network to the control requirements of the host network; and
    - an executable file that, when executed at the target network, executes the compatibility plan.

20. The system of claim 19 further configured to:
- rescan the target network to determine if the compatibility score or the compatibility plan are changed; and
- when the compatibility score or the compatibility plan are changed, update the compliance report.

* * * * *